Dec. 8, 1953 K. KAUTZ 2,661,811
APPARATUS FOR CONTINUOUSLY FILTERING SOLIDS FROM GASES
Filed Dec. 29, 1951

INVENTOR.
Karl Kautz
BY
Frease, Bishop & Hamilton
ATTORNEYS

Patented Dec. 8, 1953

2,661,811

UNITED STATES PATENT OFFICE 2,661,811

APPARATUS FOR CONTINUOUSLY FILTERING SOLIDS FROM GASES

Karl Kautz, Massillon, Ohio

Application December 29, 1951, Serial No. 264,065

8 Claims. (Cl. 183—60)

The invention relates generally to apparatus for filtering solid particles from gases, and more particularly to novel apparatus for continuously filtering hot solids from hot gases while flowing under pressure.

Certain prior filters for separating solid particles from gases have embodied fabric mesh bags on which the solid particles are collected, but such bags are not very durable under shaking or scraping to remove the solid particles, and are not able to withstand temperatures much over 200–225° F. In many instances, it is desirable as well as economical to separate the solids from the gases at much higher temperatures, so that the filtered gases or solids or both can be used while hot for various purposes, without the expense of cooling them to a suitable filtering temperature and then reheating to a higher operating temperature.

Filters embodying fine metallic screens have been proposed for filtering solids from gases at high temperatures, but such screens are unsatisfactory in many respects. For example, these screens cannot have fine enough porosity for filtering certain solids from gases and still be durable under the expansion and contraction conditions at varying high temperatures. Moreover, the cost of making fine screens of metal which is heat resistant as well as resistant to oxidation, carburization and dilute acids, is often prohibitive.

It is a general object of the present invention to provide a novel apparatus for continuously filtering solid particles from gases at high temperatures in such manner as to overcome the disadvantages of prior filters.

More particularly, it is an object of the present invention to provide a novel filtering apparatus embodying a filter element of fibrous or comminuted mineral material having high heat resistance.

Another object is to provide a novel filter having mineral material encased in perforate heat-resistant metal to permit continuously scraping the filtered solid materials from the metal surface of the filter.

A further object is to provide a novel apparatus including a cylindrical filter with radially adjustable rotatable scrapers therein.

Another object is to provide filtering apparatus having a novel filter element which is easily removed for cleaning or replacement.

A further object is to provide a novel cylindrical filter which comprises a plurality of easily connected annular sections, making the filter extensible to various lengths.

A still further object is to provide a novel filtering apparatus which is adapted for continuously filtering a variety of solid particles from gases in a variety of materials at greatly varying temperatures up to approximately 1800° F.

These and other objects are accomplished by the parts, elements, materials, combinations and arrangements comprising the present invention, a preferred embodiment of which is shown in the accompanying drawing as exemplifying the best known mode of practicing the invention, a detailed description of the invention being set forth in the following specification, and the scope of the invention being defined in the appended claims.

In general terms, the invention may be stated as comprising a cylindrical tower having refractory walls and enclosing a cylindrical filtering element spaced inwardly of the walls, there being an inlet duct for introducing a mixture of hot solids and gases through the walls into the interior of the filter and an outlet duct extending through the walls for taking off the hot filtered gases from the exterior of the filter, radially adjustable scrapers revolving within the filter for scraping solids from the interior thereof, and the filter element being made up of a plurality of separable cylindrical sections each having an inner core of fibrous or comminuted mineral matter enclosed between perforated metallic cylinders.

Referring to the drawing forming part hereof, in which a preferred embodiment of the invention is shown by way of example:

Similar numerals refer to similar parts throughout the several views of the drawing.

Figures 1, 2, 3:
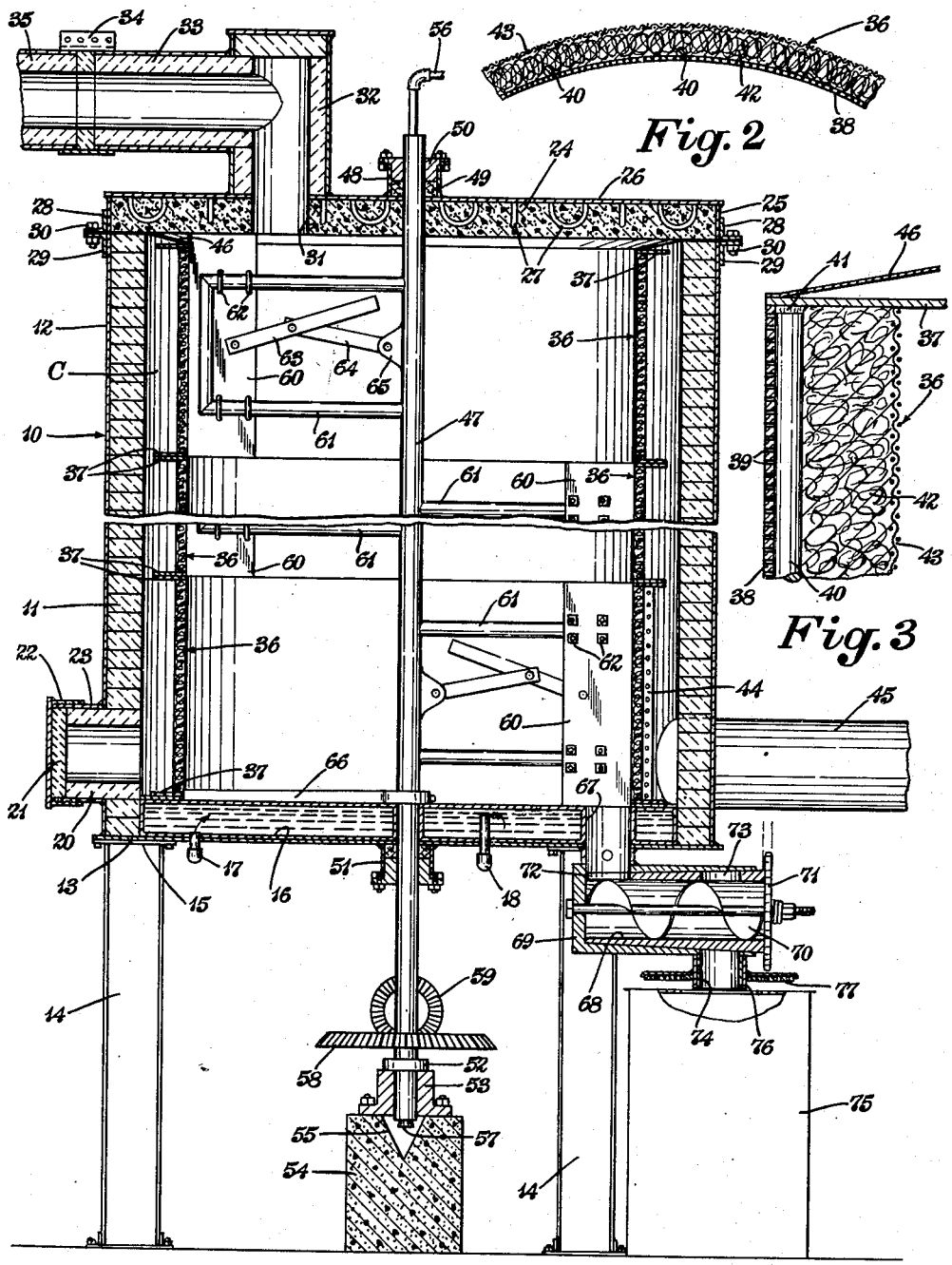
Figure 1 is a vertical cross sectional view of an apparatus embodying my invention, the central portion of the tower being broken out.
Fig. 2 is an enlarged fragmentary horizontal section through the filter element.
Fig. 3 is a further enlarged vertical section through the top of the upper filter section.

The continuous filter of the present invention can be used for filtering solids at ordinary temperatures, but is more particularly adapted for filtering hot solids from hot gases at temperatures up to 1600-1800° F. The novel filtering apparatus may be used for filtering various materials to separate hot particles from hot gases, as for example: (a) for filtering hot carbon black from hot thermally-decomposed hydrocarbon gases or from hot combustion gases, (b) for filtering hot reduced metal powders from hot hydrogen or other hot reducing gases, (c) for filtering hot sublimed oxides such as zinc oxide from hot combustion gases or hot air, (d) for desulfurizing fuel gases by continuously mixing them with sulfur absorbing powdered materials and then continuously filtering, and (e) for filtering out solid particle contaminations from hot gases such as sulfur dioxide or carbon dioxide.

The apparatus for filtering in all of the above examples is essentially the same except for minor modifications which may be required to apply to various uses, and in the interest of brevity and clarity the novel apparatus is shown and described herein as applied to the filtering of hot carbon black from hot thermally decomposed hydrocarbon gases containing principally hydrogen and carbon, so as to separate carbon black from hot hydrogen.

The novel filtering apparatus includes a preferably cylindrical tower indicated generally at 10 having a cylindrical refractory wall 11 enclosed in a steel casing 12. The wall 11 may rest on a circular metal bottom plate 13 which is supported on posts or columns 14 resting on the floor or other support, and the plate 13 may be bolted or otherwise secured to flanges 15 at the tops of the columns.

The bottom wall or floor of the tower can be refractory material but is preferably a water-cooled hollow metal wall 16 resting on the plate 13 and supported at its outer edge on the posts 14. Inlet and outlet pipes 17 and 18 respectively extend into the bottom wall for circulating cooling water therethrough. The cylindrical wall 11 is provided at one side with a refractory lined burn-out flue 20 having a refractory cap 21 normally closing the same and held in position by a metal cap 22 screwed on the metal sleeve 23 encasing the flue 20.

The top wall 24 of the tower is preferably lined with refractory concrete, and has an outer metal casing 25 with a top plate 26 having stay loops or anchors 27 extending into the concrete. The metal casing 25 of the top wall preferably has angle flanges 28 attached thereto for detachable connection with similar angle flanges 29 on the top of the side wall casing, the flanges being connected by bolts 30.

The top wall 24 is provided with an inlet opening 31 which communicates with a refractory flue 32 having a lateral connection 33. The lateral connection 33 is adapted for detachable connection, by means of a drawband 34, with a refractory lined conduit 35 adapted for introducing a hot mixture of gases and solids into the top end of the tower 10, in this case hot hydrogen carrying particles of hot carbon in suspension.

The cylindrical filter element is preferably made up of a plurality of cylindrical sections indicated generally at 36 and positioned end to end as shown in Fig. 1. Each section 36 preferably has an annular metal flange 37 at each end, and the flanges of adjoining sections may be welded together at their inner and outer edges to connect the several sections into a rigid cylindrical unit.

As shown in Figs. 2 and 3, each filter section 36 preferably includes an inner sheet metal foraminous cylinder 38 which is provided with a large plurality of perforations 39. At intervals circumferentially of the cylinder 38 are reinforcing rods 40 positioned adjacent to or against the radially outer surface of the plate 38 and extending longitudinally or parallel to the axis of the cylinder. The rods are preferably welded at their ends to the annular flanges 37 as indicated at 41.

The filter sections 36 also include a cylindrical wall or pad 42 normally of substantial thickness around the outside of the rods 40 composed of fibrous, granular or powdered material. The thickness of the pad 42 may vary from a fraction of an inch to several inches, depending upon conditions required. The material of the pad 42 is heat-resistant mineral matter and allows the pad to adjust itself to the expansion and contraction of the filter cylinder. An outer woven wire screen or mesh is positioned around the outside of the cylindrical pad 42 to hold the material of the pad in place. Preferably, these screens 43 are made in the form of drawbands having flanged ends 44 which are connected with suitable bolts or clamps so that the drawbands can be drawn together to compress or compact the material of the filter pad 42 to any desired degree. The drawbands 43, rods 40 and inner metal cylinder 38 are all of heat resistant metal, as for example Monel metal.

There are various kinds of mineral materials which are suitable for use in the pad 42, and generally these materials may be divided into four classes: (1) asbestos, (2) mineral, rock or glass wool, (3) sand or other granular mineral material, mixed with fibrous material, and (4) powdered mineral material mixed with fibrous material.

More specifically, the common long fiber variety of asbestos known as chrysotile asbestos may be used in the filter pad 42 at moderate temperatures, but because it contains water of crystallization it tends to break down at higher temperatures. Short fiber asbestos known as tremolite or actinolite does not contain water of crystallization and withstands much higher temperatures over long periods, and should be used where conditions require higher temperatures of up to 1600-1800° F. Mineral, rock or glass wool can be used for certain applications where the temperature does not exceed the softening point of the wool. For extremely high temperature applications, glass wool made from feldspar or silica glass is very satisfactory. In certain cases granular or powdered material such as firebrick, may be used if mixed with asbestos or glass wool.

When the cylindrical filter element has been made up by connecting several sections together it is inserted within the tower 10, the outer diameter of the cylinder being substantially less than the inner diameter of the tower wall 11 so that an annular chamber C is provided between the tower wall and the drawbands 43 around the exterior of the filter. A gas conduit 45 is connected to the lower portion of chamber C for taking off hot filtered hydrogen. Any number of the filter sections 36 may be used depending upon the height of the tower which is calculated to bring the top of the tower wall 11 close to the top flange 37 of the top section 36.

In order to make a gas-tight seal at the top of the tower wall and enclose the annular chamber C, an annular strip of very light gauge sheet metal 46 is welded at its inner edge to the inner edge of the top flange 37, and extends radially outward therefrom between the top wall 24 and the top of the tower wall 11 to terminate between the angle flanges 28 and 29. The annular strip 46 is very thin and flexible so as to readily accommodate itself to differences in the level of the filter and the tower walls and to uneven surfaces of the tower and top walls. Suitable gaskets may be inserted between the top and bottom surfaces of the sealing strip 46 and the angle flanges 28 and 29 to insure a gas-tight seal.

A water-cooled shaft 47 extends axially through the tower 10, the upper end projecting through the removable top wall 24 through a suitable stuffing gland 48 embodying refractory material 49 compressed axially of the shaft by a plug 50. The lower end portion of the shaft projects through the water-cooled bottom wall 16 and bottom plate 13, and has a stuffing gland 51 similar to the stuffing gland 48. The lower projecting end of the shaft 47 may have a collar 52 welded thereon and supported on a bearing 53 which rests on a concrete support 54. The top of the concrete support 54 may have a trough-shaped opening 55 in its upper end positioned under the bottom end of the shaft to carry off the cooling water which enters through the pipe 56 and passes through the hollow shaft 47. The bottom end of the shaft may have a stopper 57 therein provided with a stricted opening to control the flow of the circulating water through the shaft. As shown, the shaft 47 may be provided adjacent the collar 52 with a bevel gear 58 which is driven by a bevel pinion 59 operatively connected to suitable driving means for rotating the shaft 47 at a desired speed.

The scrapers for rotating within the filter element 36 to scrape carbon black off the inner cylindric surface of the plate 38 are preferably equal in height to the sections 36, and are staggered or alternately mounted on opposite sides of the shaft, there being preferably one scraper for each filter section 36. Each scraper may consist of a plate or sheet 60 positioned radially of the filter cylinder with its outer edge closely adjacent to or in contact with the inner surface of the cylinder 38. Each scraper 60 is preferably mounted on a water-cooled U-shaped hollow bracket 61 the inner ends of which are welded to and communicate with the shaft 47 for passing cooling water therethrough, and the scrapers being mounted for sliding radially on the brackets by means of U bolts 62.

In order to make the scrapers 60 self-adjusting radially, each scraper has a toggle connection with the shaft 47 consisting of a preferably double lever arm 63 pivoted to the central portion of the scraper and a lever arm 64 pivoted to an ear 65 on the shaft. The lever 64 is pivoted to an intermediate portion of the double lever arm 63 at a point located above the pivotal connections with the scraper and the shaft, and the arms 63 and 64 are made of relatively heavy metal stock so that their weight urges the scrapers radially outward. If desired, the scrapers may be set or locked at any radial position by tightening the U bolt 62 to prevent sliding thereof on the brackets 61. This may be done to allow a coating or layer of the solid material being filtered (in this case carbon) to remain on the inner surface of the filter element, so that the coating will act as a supplementary filtering pad for fresh material.

Opposite the lowermost scraper 60, a drag scraper 66 preferably of spiral design is attached to the shaft 47 for collecting solid material removed by the scrapers 60 and dropping onto the bottom wall 16. The drag scraper 66 gathers the solid material, conveys it to an opening 67 in the bottom wall 16 adjacent to the filter element and the collected material drops through the opening 67 into the tapered sleeve 68 of a discharge drum 69. The tapered sleeve has a screw conveyer 70 therein and the sleeve and conveyer are rotated by a sprocket 71 which seals the outer end of the sleeve, the sprocket being driven by a suitable chain connected to a gear motor for reducing the speed of rotation of the sprocket. One side of the tapered sleeve 68 is provided with a port 72 for intermittently connecting with the opening 67, and also is provided with a discharge port 73 for intermittently connecting with a discharge pipe 74 in the bottom of the drum 69. Thus when the port 72 is in communication with the opening 67, the sleeve closes the discharge pipe 74, and when the port 73 is in communication with the discharge pipe 74 the sleeve closes the opening 67.

The discharge pipe 74 empties into a steel drum 75 for collecting the carbon black, and the pipe 74 has an outer sleeve 76 thereon having an annular asbestos pad 77 attached thereto for making a seal with the top of the drum 75 when the sleeve 76 is lowered.

In the operation of the novel apparatus for filtering hot carbon black from hot hydrogen, the hot hydrogen containing carbon black particles in suspension is introduced through the conduit 35 into the interior of the filter. The hot hydrogen gas and carbon entering through the conduit 35 may be at a temperature of 1200–1800° F., having been thermally decomposed from hydrocarbon gas in a suitable furnace and then passed through cooling means to reduce the gas and carbon to such temperatures. The continuous filter of the present invention can be used in conjunction with the controlled atmosphere furnace disclosed in my co-pending application, Serial No. 205,280, filed January 10, 1951, when that furnace is suitably arranged as a cracking, or hydrogen-generating furnace for thermally decomposing hydrocarbons to yield hot hydrogen and hot carbon black.

After the mixture has filled the inside of the cylindrical filter, the pressure of the incoming gas and carbon will force the hydrogen gas outwardly through the filter element and the carbon particles will be deposited on the inner surface of the metal cylinder 38, where the built-up particles are constantly scraped off the cylinder by the rotating scrapers 60. The carbon black removed by the scrapers drops onto the water-cooled bottom wall 16 of the tower where it is cooled and delivered through the drum 69 into the container 75 in the manner previously described. The hot filtered hydrogen at temperatures of about 1100–1700° F. is taken off through the conduit 45 and may be used for various purposes, as for example in the process of smelting hydrogen-reducible ores disclosed in my co-pending application Serial No. 261,037, filed December 11, 1951.

When the filter pad 42 becomes clogged so that it does not permit the free passage of gases therethrough, the carbon particles may be burned out of the filter by closing conduit 45 and introducing hot air through the intake conduit 35 so that it passes through the filter pad and exits through the burn-out flue 20. When the filter is used for filtering from different gases other particles such as metal or metallic oxide particles, the filter pad may be cleaned by first lifting out the whole filter cylinder after the top wall 24 is removed, and the filter pad may then be cleaned by leaching or pickling it in suitable dilute acids or alkalis to dissolve the metal particles. Where insoluble solid particles are filtered, the pad 42 of the filter must be replaced when it becomes clogged.

The present improved filtering apparatus provides a filter which is durable at high temperatures, and has an inner perforate metal cylinder which will stand the scraping of the solid particles therefrom. Moreover, the mineral material of the filter pad will withstand the high temperatures and can be compressed to meet varying conditions. The novel cylindrical filter is economical because it is made up of easily connected annular sections which make the filter extensible to various lengths, and the built-up cylindrical filter is easily inserted into the refractory tower or removed therefrom for cleaning or replacing the filter pad. Furthermore, the novel filter has the advantage of being adapted to filter hot solids from a variety of gaseous materials at a wide range of temperatures.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

I claim:

1. Filtering apparatus including a tower having refractory walls and a bottom wall, a cylindrical filter spaced inwardly of said refractory walls, means for introducing a hot mixture of gases and solids into the interior of the filter, means for removing hot filtered gases from said tower, a rotatable shaft extending axially through said filter, a plurality of vertical radially-adjustable scrapers staggered on said shaft for scraping hot particles from the inner surface of said filter, and said filter having a cylindrical core of heat-resistant mineral matter enclosed between inner and outer metal cylinders.

2. Filtering apparatus including a tower having refractory walls, a cylindrical filter spaced inwardly of said refractory walls, means for introducing a hot mixture of gases and solids into the interior of the filter, means for removing hot filtered gases from said tower, a rotatable water-cooled shaft extending through said filter, a plurality of vertical radially-adjustable scrapers staggered on said shaft for scraping hot particles from the inner surface of said filter, a water-cooled bottom wall for cooling and collecting said particles, and said filter having a cylindrical core of heat-resistant mineral matter enclosed between inner and outer metal cylinders.

3. Filtering apparatus including a cylindrical tower having a refractory side wall and a removable refractory top wall, a cylindrical filter spaced inwardly of said side wall within said tower and having a foraminous metal cylinder on its inner surface, flexible annular sealing means attached to the top of said cylindrical filter and extending radially outwardly between the side and top walls of the tower, means clamping said sealing means between the top wall and side wall, a duct for introducing a gas containing solid particles into the interior of said filter, and an outlet duct for taking off filtered gas from between the filter and the tower.

4. Filtering apparatus including a cylindrical tower having a refractory side wall and a removable refractory top wall, a cylindrical filter spaced inwardly of said side wall within said tower and having a foraminous metal cylinder on its inner surface, flexible annular sealing means attached to the top of said cylindrical filter and extending radially outwardly between the side and top walls of the tower, means clamping said sealing means between the top wall and side wall, rotatable scrapers within said filter for scraping solid particles from said inner metal cylinder, a duct for introducing a gas containing solid particles into the interior of said filter, and an outlet duct for taking off filtered gas from between the filter and the tower.

5. Filtering apparatus including a cylindrical tower having a refractory side wall, a removable refractory top wall and a bottom wall, a cylindrical filter spaced inwardly of said side wall supported on said bottom wall and having a foraminous metal cylinder on its inner surface, flexible annular sealing means attached to the top of said cylindrical filter and extending radially outwardly between the side and top walls of the tower for enclosing and sealing off the annular chamber between the filter and tower side wall, means clamping said sealing means between the top wall and side wall, a duct for introducing a gas containing solid particles into the interior of said filter, a duct for taking off filtered gas from said annular chamber, a rotatable shaft extending axially through said filter, and scrapers mounted on said shaft for scraping solid particles from said inner metal cylinder of the filter.

6. Filtering apparatus including a cylindrical tower having a refractory side wall, a removable refractory top wall and a bottom wall, a cylindrical filter spaced inwardly of said side wall supported on said bottom wall and having a foraminous metal cylinder on its inner surface, flexible annular sealing means attached to the top of said cylindrical filter and extending radially outwardly between the side and top walls of the tower for enclosing the annular chamber between the filter and tower side wall, means clamping said sealing means between the top wall and side wall, a duct for introducing a gas containing solid particles into the interior of said filter, a duct for taking off filtered gas from said annular chamber, a rotatable shaft extending axially through said filter, brackets mounted on said shaft and extending radially therefrom, scrapers slidably mounted on said brackets, and weighted toggle means urging said scrapers radially outward toward the inner metallic cylinder of the filter.

7. In apparatus for filtering hot gases from hot solid particles, a cylindrical filtering element made up of cylindrical sections detachably connected end-to-end, each section comprising an inner perforated metal cylinder having annular flanges at its ends for connecting with adjacent sections, a core of heat-resistant mineral matter, an outer foraminous metal cylinder compressing said mineral matter and an individual scraper rotatably mounted within each section for scraping particles from the inner cylinder of each section.

8. In apparatus for filtering hot gases from hot solid particles, a cylindrical filtering element made up of cylindrical sections detachably connected end-to-end, each section comprising an inner perforated metal cylinder having annular flanges at its ends for connecting with adjacent sections, a core of heat-resistant mineral matter containing fibrous asbestos, an outer foraminous draw band cylinder, and an individual scraper rotatably mounted within each section for scraping particles from the inner cylinder of each section.

KARL KAUTZ.

References Cited in the file of this patent

UNITED STATES PATENTS

| Number | Name | Date |
| --- | --- | --- |
| 1,738,717 | Matlock | Dec. 10, 1929 |
| 2,057,446 | Rathbun | Oct. 13, 1936 |
| 2,594,456 | Kroenlein | Apr. 29, 1952 |

FOREIGN PATENTS

| Number | Country | Date |
| --- | --- | --- |
| 68,445 | Switzerland | May 8, 1914 |
| 663,382 | Great Britain | Dec. 19, 1951 |